2,986,535
Patented May 30, 1961

2,986,535
FLAMEPROOF CELLULAR POLYSTYRENE COMPOSITIONS AND METHOD OF PREPARING SAME

Ulf Carl Henrik Jacobson, Goteborg, Sweden, assignor to Isoleringsaktiebolaget WMB, Goteborg, Sweden, a corporation of Sweden No Drawing. Filed July 7, 1955, Ser. No. 520,623

5 Claims. (Cl. 260—2.5)

My invention relates to a method of producing insulating bodies from grains or granules of plastic material.

More particularly my invention relates to a method of producing insulating bodies from grains or granules of plastic material, said granules initially being expanded into a porous state and subsequently agglutinated by the influence of heat. As an example for such plastic material polystyrene I mention to which an expanding or blowing agent, such as petroleum ether, is added. The starting material consists of compact granules which are heated preferably by means of a liquid such as water, to a temperature of 90–100° C. and in this way caused to increase their volume by 50 times or more.

A plastic material such as polystyrene is ignited easily and burns quickly while developing a clear flame, any afterglowing, however, not occurring in practice. If the material is chlorinated in order to make it flame-proof, it becomes difficult to blow so that the finished insulating body will not have the desired low weight per unit of volume.

In accordance with the present invention the flame-proofing composition is dispersed about the expanded granules in the form of a powder which becomes plasticized when heat is applied. The flame-proofing composition further should be of a kind subject to decomposition by heating and to development of an inert gas, such as chlorine or nitrogen.

Water-soluble agents are less suitable, in particular if the porous body of plastic material is intended to be used as heat insulating material absorbing moisture. Such moisture migrates within the heat-insulated wall from the warm side to the cold side causing the agent in question successively to collect at the cold side of the isolation and thereby to a large extent to lose its protecting effect. Water-soluble flame-proofing agents are further adapted to permit biological life to develop in the interior of the insulation.

One main object of my invention is to provide a method of producing insulating bodies from granules of plastic material resulting in finished articles meeting all requirements.

A further object of my invention is to provide such method of producing insulating bodies which have improved fire-proof properties and increased strength in comparison to similar products hitherto known.

A still further object of my invention is to provide a method of producing insulating bodies of the kind in consideration at lower costs than hitherto due to a reduction of the necessary quantities of fire-proofing agent added for ensuring a reliable protecting effect.

I have found that an addition of chlorinated paraffin to the expanded grains or granules will result in a non-inflammable insulating body of excellent mechanical strength, provided that the chlorinated paraffin holds a high content of chlorine, suitably in the range from 65 to 75% and preferably about 70%. A further condition is that the chlorinated paraffin is of such nature as during its addition to the granules to have a pulverant and non-tacky, solid state within a temperature range up to at least +20° and preferably +40° C. This condition may also be expressed by the statement that the individual particles of the powder must be displaceable relatively to one another at the moment of their addition to the granules. I powder the expanded porous granules of plastic material with the pulverant chlorinated paraffin in which connection it is important that said granules are moist in order to cause the powder to stick thereto.

When finally agglutinating the porous plastic granules in the heat, preferably by means of water or steam and at a temperature between 90 and 130° C., the powder is plastified or fuses and thus acts as an adhesive considerably improving the strength of the insulating body. The flame-proofing agent added thus has as a further important effect to increase the mechanical strength of the finished product. Thus, the flame-proofing agent must be of such nature as to change into a plastified or fused state at the temperature prevailing during the agglutination of the granules.

Example 90 parts by weight of granular polystyrene are in any known manner by hot water having a temperature of 95° C. caused to expand. To these expanded granules 50 parts by weight of a commercial quality of chlorinated paraffin available in open trade under the denomination "Cereklor 70" are added.

The porous granules are agglutinated in a known manner in a mould having the desired shape of the finished product and its base portion perforated. I supply steam having a temperature of 115° C. until the agglutination is complete. Thereupon the finished product is cooled. It has a very low weight per unit of volume, is practically non-inflammable and has a mechanical strength sufficient for all practical purposes.

It is known in prior art to use chlorinated paraffin combined with antimony trioxide as a flame-proofing means. When adding both said substances in parts by weight together equalling the total quantity of solely chlorinated paraffin set forth above, the final product has proved to be flame-proof but to have poor strength. For the purpose of illustration I mention that by adding 14 parts by weight of chlorinated paraffin to 20 parts by weight of a granular plastic material such as polystyrene, for example, a product is obtained that has good strength and is difficult to ignite. When adding to the same quantity of said granular plastic material 10 parts by weight of chlorinated paraffin and 4 parts by weight of antimony trioxide, the strength of the final product becomes insufficient. However, when causing 20 parts by weight of the granular plastic material to expand and then powdering the expanded granules with a mixture of 8 parts by weight of chlorinated paraffin and 2 parts by weight of antimony trioxide I obtain a porous plastic product which has a very good strength and at the same time is highly flame-proof. This result thus implies that the addition of antimony trioxide renders possible considerably to reduce the quantity of the flame-proofing agent and therewith the costs of the relatively expensive agent.

As will be readily understood from the above, the part of the antimony trioxide in the added substances ought to be smaller than that of the added chlorinated paraffin and further that the total quantity of chlorinated paraffin and antimony trioxide together ought to be less than the quantity required for attaining a reliable flame-proofing effect with solely chlorinated paraffin.

Other flame-proofing agents, such as chlorine containing vinyl-compounds, may also be used provided that they have the properties inherent to the chlorinated paraffin preferred to be used in the examples given above.

What I claim is:

1. The method of producing insulating bodies from a mass of pre-expanded porous granules of polystyrene, which comprises dusting onto said pre-expanded granules a flame-proofing composition comprising chlorinated paraffin in the form of a powder exhibiting freely-running properties at temperatures of at least 20° centigrade and up to those at which it is dusted onto said pre-expanded granules, but becoming plastified at temperatures between 90° and 130° centigrade, said flame-proofing composition having a chlorine content of 65 percent to 75 percent, then heating the thus powdered, pre-expanded, granules to a temperature between about 90° and about 130° centigrade to cause said flame-proofing composition to agglutinize said pre-expanded granules carrying said powder into a coherent mass.

2. A method according to claim 1 in which said flame-proofing composition comprises chlorinated paraffin and antimony trioxide, said antimony trioxide being present in an amount less than the amount of chlorinated paraffin.

3. A method according to claim 1 in which said flame-proofing composition comprises about 8 parts by weight of chlorinated paraffin and about 2 parts by weight of antimony trioxide for each 20 parts of said granules.

4. An insulating body comprising a mass of pre-expanded porous granules of polystyrene agglutinized by a flame-proofing composition comprising fused chlorinated paraffin, said body having been produced by the process defined in claim 1.

5. An insulating body comprising a mass of pre-expanded porous granules of polystyrene agglutinized by a flame-proofing composition comprising fused chlorinated paraffin and antimony trioxide, in the amounts of about 20 parts by weight polystyrene, about 8 parts by weight chlorinated paraffin and about 2 parts by weight antimony trioxide, said body having been produced by the process defined in claim 2.

References Cited in the file of this patent

UNITED STATES PATENTS

| | | |
|---|---|---|
| 2,590,211 | Rugar | Mar. 25, 1952 |
| 2,744,291 | Stastny et al. | May 8, 1956 |
| 2,894,918 | Killoran et al. | July 14, 1959 |